United States Patent [19]
Rosenbaum et al.

[11] Patent Number: 4,675,958
[45] Date of Patent: Jun. 30, 1987

[54] CARTRIDGE RELOADING APPARATUS AND METHOD

[76] Inventors: Glen E. Rosenbaum, 130 Russell Rd.; Delmer C. Harrington, Rte. 3, both of Abingdon, Va. 24210

[21] Appl. No.: 866,339

[22] Filed: May 23, 1986

[51] Int. Cl.⁴ .................... B21D 51/54; F42B 33/02; F42B 33/10
[52] U.S. Cl. ........................ 29/1.32; 86/24; 86/37
[58] Field of Search ............... 29/1.3, 1.31, 1.32; 86/24, 21, 26, 28, 33, 37, 38, 40

[56] References Cited

U.S. PATENT DOCUMENTS

| | | | |
|---|---|---|---|
| 1,864,880 | 6/1932 | Zimmerman | 86/37 |
| 3,094,044 | 8/1962 | English | 86/24 |
| 3,174,390 | 3/1965 | Jacobsen | 86/24 |
| 3,705,515 | 12/1972 | Lee | 86/24 |
| 3,735,666 | 5/1973 | Decker | 86/24 |
| 4,336,739 | 6/1982 | Alexander | 86/24 |
| 4,512,235 | 4/1985 | Lee et al. | 86/24 |
| 4,566,366 | 1/1986 | Lee | 86/24 |
| 4,593,598 | 6/1986 | Gunder | 86/37 |

Primary Examiner—Howard N. Goldberg
Assistant Examiner—Steven Nichols

[57] ABSTRACT

The process for dimensioning the neck of a used cartridge casing comprising providing an extrusion ram having a head and shank, inserting said head through the aperture of said neck, said head having a diameter slightly less than the diameter of said aperture, applying substantially uniform pressure circumferentially to the outer surface of said neck to reduce the inside diameter thereof to slightly less than the diameter of said head, withdrawing said head through said aperture while retaining said pressure on said outer surface of said neck, thereby causing excess metal in portions of said neck to extrude axially toward the outer end thereof, and thereafter trimming excess of said extruded metal from said outer end.

15 Claims, 5 Drawing Figures

CARTRIDGE RELOADING APPARATUS AND METHOD

This invention concerns apparatus and method for the reloading of cartridges, and particularly relates to greatly improved apparatus and method for preparing rifle cartridge casings for reloading, regardless of the extent of their prior use or of the mechanical inaccuracies of the rifles in which they were fired.

The art and science of shooting, particularly target or bench shooting is highly developed and special cartridge reloading apparatus and techniques are available to provide the marksman with mechanically accurate and properly sized cartridges. As with all mechanical devices however, the accuracy of their operation is a matter of degree which is determined in large measure by the underlying theory of their construction and mode of operation.

Typical and presently available cartridge casing preparation or manufacturing devices are shown and described, for example, in "John Olson's Book of the RIFLE," J. Philip O'Hara, Inc. Chicago, Copyright 1974, in "The Accurate Rifle" by Warren Page, Stoeger Publishing Company, Copyright 1973, in "Hornady Handbook of Cartridge Reloading," Hornady Manufacturing Company, Inc., Copyright 1973, and in U.S. Pat. Nos.: 2,825,259; and 4,296,536.

In the use of these devices the various operations such as casing neck and body alignment, neck internal diameter sizing, neck external diameter sizing, neck wall thickness sizing, and neck annealing are essentially independently performed and in the final analysis represent a non-integrated process wherein the accuracy achieved in one operation is not carried over into the next operation. For example, in the use of reloading apparatus such as shown in Olson's "Rifle," ibid, at page 156, the internal diameter sizing of the casing neck by means of the expander butten E has little if any relationship to the necessary sizing of the neck external diameter which must be accomplished by a subsequent machining step extrinsic to the reloader as described for example in "The Accurate Rifle" ibid, in Chapter 17, wherein a lathe type machine is used to turn metal from any high point on the external diameter of the neck resulting from the neck expansion step. Part of the problem in achieving proper neck dimensions is the annealing techniques presently used, and an aspect of the present invention, is the provision of uniform annealing around the circumference of the neck which is especially suitable to the present apparatus and method. It is particularly noted that as a result of the non-integrated operations of the devices such as noted above, they are not capable of accurately and uniformly sizing the casing neck wall thickness. This incapability represents to the expert rifleman a serious problem to achieving the desired uniform pressure of the neck on the bullet which is important to proper release of the bullet for consequent axial alignment thereof with the rifle barrel. Needless to say, if the reloading can only provide approximate uniformity in neck pressure and in "bullet pull," then the accuracy of the shooting will only be approximate since lack of axial alignment and non-uniformity in "bullet pull" will tend to cock the bullet in the barrel and alter nuzzle velocity as well as other shooting parameters.

Objects therefore of the present invention are: to provide improved apparatus and method for axially aligning the neck and body of cartridge casings; to provide such apparatus and method with means for dimensioning the cartridge casing neck wall thickness; to provide such apparatus with means for dimensioning the overall casing length as a function of neck wall thickness adjustment; and to provide overall and subcombinations of unique means and method steps for said apparatus, in an integrated and highly cooperative manner.

These and other objects hereinafter appearing have been attained in accordance with the present invention which in its method embodiment broadly comprises the process for dimensioning the neck of a used cartridge casing comprising providing an extrusion ram having a head and shank, inserting said head through the aperture of said neck, said head having a diameter slightly less than the diameter of said aperture, applying substantially uniform pressure circumferentially to the outer surface of said neck to reduce the inside diameter thereof to slightly less than the diameter of said head, withdrawing said head through said aperture while retaining said pressure on said outer surface of said neck, thereby causing excess metal in portions of said neck to extrude axially toward the outer end thereof, and thereafter trimming excess of said extruded metal from said outer end.

Further embodiments of the present process are as follows:

(a) said outer surface of said neck and the outer surface of said head are maintained in essentially perfect concentricity and axial alignment during withdrawal of said head through said aperture to provide thereby essentially uniform circumferential thickness of the neck wall;

(b) the outer surfaces of the body and neck of said casing are maintained in essentially perfect concentricity and axial alignment during said application of pressure to the outer surface of said neck;

(c) said casing is brass and said neck is annealed prior to the diameter reduction and axial extrusion thereof;

(d) the annealing is substantially uniform around the circumference of said neck; and (e) said uniform pressure is generated by forcing said cartridge neck into the smaller diameter second cavity of said die.

The present cartridge reloading apparatus, in its broad embodiment, comprises cartridge casing support means adapted to engage the base of a cartridge casing for holding said casing in a fixed attitude, die means having a first cavity formed to receive a substantial portion of the body of said casing and a second and contiguous cavity formed to receive the neck of said casing, frame means for supporting said support means and said die means with the axis of said die cavities and said support means being essentially in alignment, extrusion ram means having a shank and a head, the diameter of said head being greater than the diameter of the adjacent portion of said shank, first power means for axially moving said support means and said die means with respect to each other, and second power means for progressively moving said head axially into and out of said die cavities independently of any relative motion between said support means and said die means.

Distinct and individual preferred embodiments of the present invention, with reference to the above broad definition of the invention, are as follows:

(a) the overall surface contours of said first and second die cavities substantially conform to the cartridge casing body and neck contours;

(b) said support means is mounted on said frame means for axial motion and said die means is mounted on said frame means in fixed position;

(c) the die means comprises a die body which contains said first and second cavities and which is provided with connector means for removably connecting said die means to said frame means;

(d) the second power means comprises a hand lever pivotally connected at a first point intermediate its ends to said ram means, and pivotally connected at a second point adjacent one of its ends to one end of a link bar, the other end of said link bar being pivotally connected to a stationary portion of the apparatus, whereby force applied to said ram means by the lever will always be substantially axial;

(e) the connector means of (c) above comprises a threaded end of said die body mating with a threaded aperture in said frame means;

(f) the die body is further provided with a cylindrical aperture for slidably receiving said ram means, the axis of said aperture being essentially in alignment with the axis of said die cavities and said support means;

(g) the link bar (d) above is pivotally connected to a split collar which is adapted to clamp to said die body; and (h) said shank of said ram is removably threaded into said ram for replacement with a head of different dimensions.

The invention will be further understood from the following description and drawings wherein:

FIG. 2 is an enlarged cross-sectional view of a portion of the apparatus of FIG. 1;

FIG. 3 is an enlarged portion of a cartridge casing redimensioned in accordance with the present invention showing extruded excess metal at the neck end.

FIG. 4 is a top view of the cartridge support means; and

FIG. 5 is a side view of FIG. 4.

Figure 1:
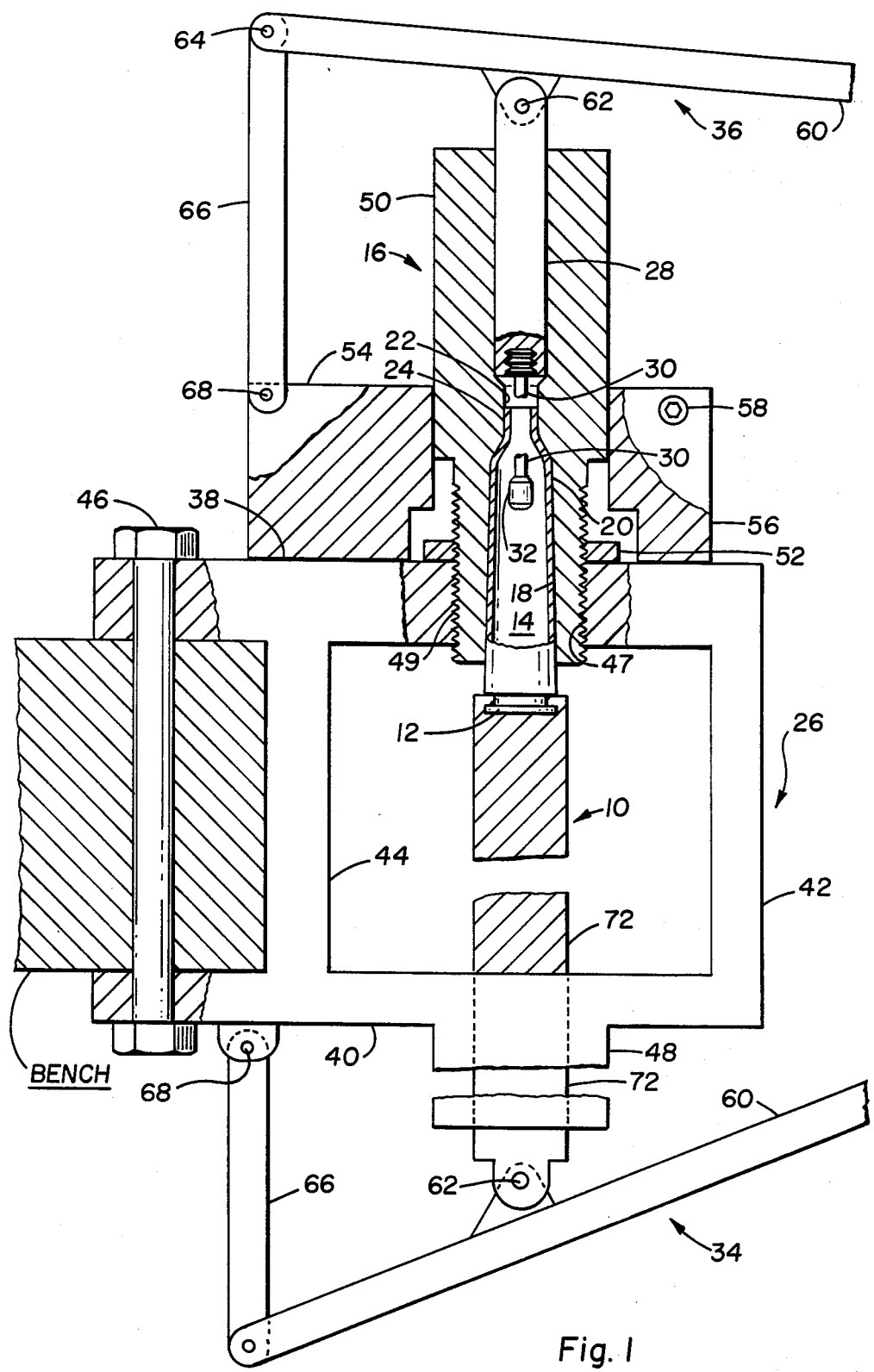
FIG. 1 is a side view of the apparatus, partially in cross-section, showing a cartridge casing in place.

Referring to the drawing, and with reference to claim 1 below, the cartridge reloading apparatus comprises cartridge casing support means 10 adapted to engage the base 12 of a cartridge casing 14 for holding said casing in a fixed attitude, die means 16 having a cavity 18 formed to receive a substantial portion of the body 20 of said casing and a second and contiguous cavity 22 formed to receive the neck 24 of said casing, frame means 26 for supporting said support means and said die means with the axis of said die cavities and said support means being essentially in alignment, extrusion ram means 28 having a shank 30 and a head 32, the diameter of said head being greater than the diameter of the adjacent portion of said shank, first power means 34 for axially moving said support means and said die means with respect to each other, and second power means 36 for progressively moving said head axially into and out of said die cavities independently of any relative motion between said support means 10 and said die means 16.

The frame means generally designated 26 may comprise any convenient structure which is typified by that shown in FIG. 1 as comprising top plate 38, bottom plate 40, upright segments 42 and 44, bolt or other clamping device 46 and cylinder 48. Any number of segments such as 42 and 44 may be employed, however, in order to provide ready access to cartridge support 10, it is preferred to leave adequate spacing between these segments as shown.

A threaded aperture 47 is provided in plate 38 for receiving a mating threaded end 49 of die body 50, a lock nut 52 holds end 49 securely in place in aperture 47 to insure essentially perfect alignment of the axis of cartridge support 10 with the axis of die cavities 18 and 22 and the axis of ram 28. A collar 54 which normally snugly fits over die body 50 is provided with a split side 56 and tightening bolt 58 for securely but removably locking onto die body 50. Hand lever 60 is pivotally connected at 62 to the outer end of ram 28, and at its end 64 to link bar 66 which in turn is pivotally connected at 68 to collar 54. This arrangement insures that the forces exerted on ram 28 will always be substantially axial.

Referring to the enlarged view of FIG. 2, the diameter of shank 30 is shown disproportionately small for purposes of clarity and in actual use, this shank preferably is only slightly less in diameter than head 32. Moreover, the length of shank 30 is kept to a minimum, and this coupled with its maximum allowable diameter insures that flexing of the shank is kept to a minimum. This feature is important in order to obtain maximum uniformity in neck wall thickness which results from head 32 being pulled outwardly through the annealed neck 24 in a perfectly axial path. As shown in FIG. 3 when this is done, any excess metal from a too-thick portion of the neck wall is extruded axially outwardly to create a projection typified at 70 above line A—A, which projection is then cut off to provide a perfectly dimensioned neck.

The casing support 10 may be of any convenient structure as long as it can hold the casing in a porper fixed upright attitude whereby the casing axis is essentially perfectly aligned with the ram and die cavity axis. Preferably the support comprises a ram 72 slidably mounted in cyliner 48. This ram 72 is preferably powered by the same type of hand lever mechanism used to power ram 28 although in both cases a large variety of power mechanisms including cams such as shown in U.S. Pat. No. 2,825,259 at 36, or hydraulic screw or solenoid types may be employed.

The casing supporting end 74 of ram 72 preferably provides a slot 76 terminating in a half circle 77 at the center of the ram end 78 wherein the curved surface of 77 carries a semicircular projection 80 which is adapted to fit with sliding tolerances into the retractor groove 82 in the casing base 12 as the casing, positioned upright in the embodiment shown, is slid into position at the axial center of ram 72. A complementary slide 82 having a cross-sectional configuration identical to slot 76 and projection 80, but additionally as shown in FIGS. 4 and 5, the outward portion of slot 76 and the edges of slide 82 may be provided with mating grooves 84 and projections 86 respectively for lending stability to the slide. After the casing is slid into slot 76, slide 82 is slid into position as shown in FIG. 4 to provide projection 80 completely encircling the casing base to provide a more uniform pressure on the casing as it is pulled out of the die body.

Referring to FIG. 2, a dotted line projection 88 represents a typical spent primer knock-out punch which may be provided on head 30 in customary manner. A recess 90 in ram 72 such as shown by dotted line may be provided to accommodate the punched-out primer.

The present apparatus can be sized for any caliber cartridge and is particularly useful for, although not limited to, tapered casings. For a particular caliber cartridge, the die cavities remain the same dimensions, however the ram head can be altered to suit a particular marksman's requirements, for example, in regard to "bullet pull". As an example, for a 243 caliber bullet size, the ram head is typically provided in four sizes: 0.241; 0.2415; 0.242; and 0.2425 inches in diameter according to the "bullet pull" desired or specific operating parameters of the gun.

The present apparatus and method represent substantial advances in the art, wherein heretofore in prior apparatus, the cartridge case is first pressed into the die to squeeze it down to a specific size. As this is done, the excess brass runs to the inside of the case neck. As the case is then pulled from the die, the neck is pulled over an expander to expand the neck to accept the bullet when reloaded. The problem with this procedure is that as the neck is pulled over the expander the excess brass runs to the outside again since the cartridge case is not supported by the die. If the neck is harder on one side, that side will resist expansion and the soft side will give, causing out of round conditions. The soft side will also stretch lengthwise and cause the neck to be out of line with the rest of the cartridge.

In the present process the cartridge case is pressed into a die with the ram head previously inserted through the neck and is squeezed down to a specific size while the neck is also forced to align itself with the cartridge. The entire cartridge case is held straight in the die. The excess brass and any egg shaped portion of the case neck are forced to the inside. The precision ground swedge or ram head is now pulled up through the case neck. As the swedge comes up through the neck the brass flows ahead of the swedge and fills low places. The high places are forced to flow ahead of the swedge. As the swedge comes out of the neck, excess brass is pulled out lengthwise causing the case neck to get longer. The case is pulled from the die. The case neck is then trimmed off to provide a cartridge case that has a perfectly aligned neck and body. When a round bullet is placed in the neck it is gripped equally all the way around, giving a uniform "bullet pull" or uniform neck tension effect.

In a preferred embodiment, due to the brass cases tending to work harden rapidly, the cases are re-annealed after swedging the first time and then re-swedged one more time to correct any warpage due to annealing. The cases having already been swedged once, now go through the second swedging operation much easier since all that is being done, essentially, is re-aligning the neck.

The invention has been described in detail with particular reference to preferred embodiments thereof, but it will be understood that variations and modifications can be effected within the spirit and scope of the invention.

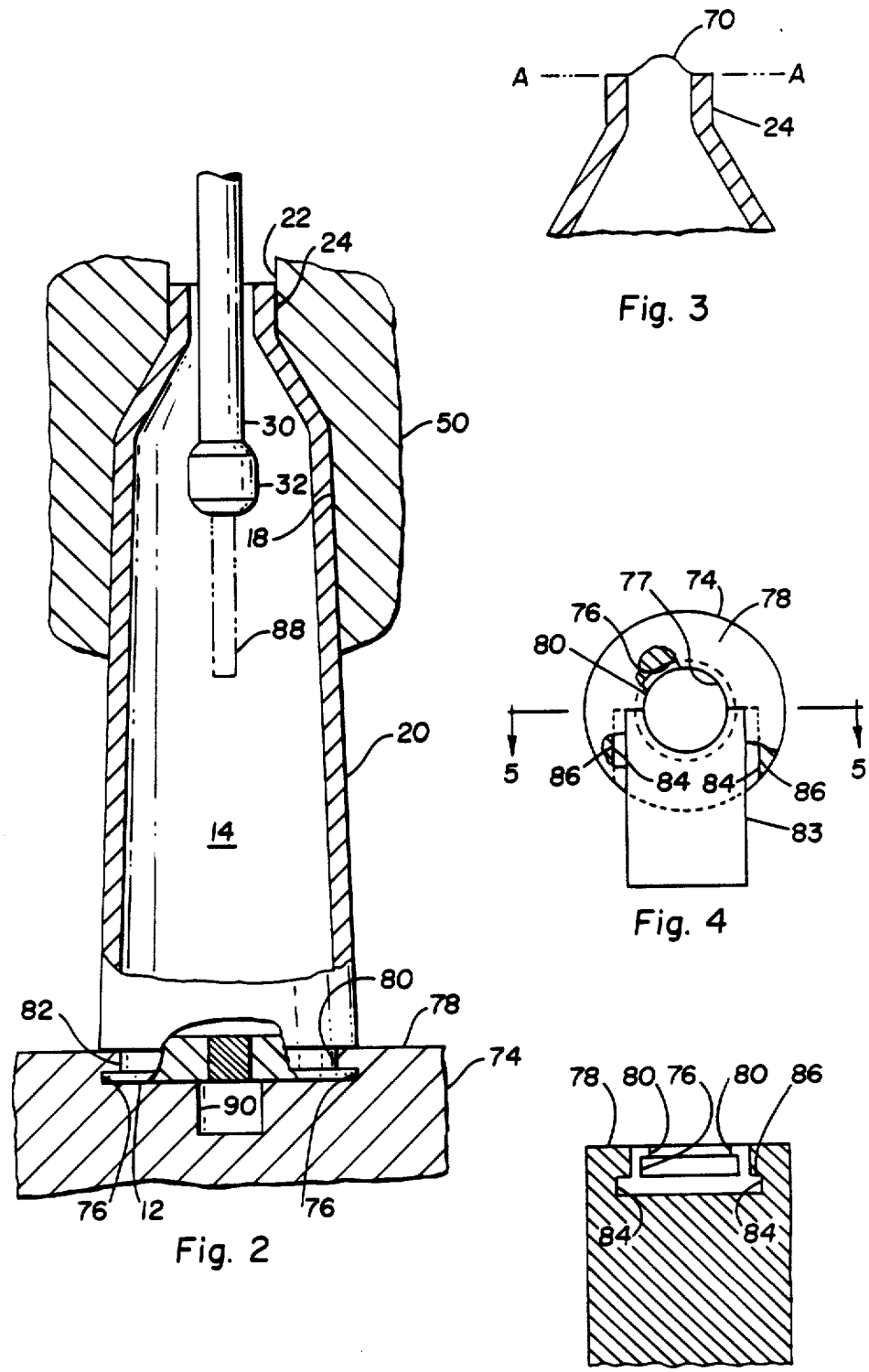

We claim:

1. The process for dimensioning the neck of a used cartridge casing comprising providing an extrusion ram having a head and shank, inserting said head through the aperture of said neck, said head having a diameter slightly less than the diameter of said aperture, applying substantially uniform pressure circumferentially to the outer surface of said neck to reduce the inside diameter thereof to slightly less than the diameter of said head, withdrawing said head through said aperture while retaining said pressure on said outer surface of said neck, thereby causing excess metal in portions of said neck to extrude axially toward the outer end thereof, and thereafter trimming excess of said extruded metal from said outer end.

2. The process of claim 1 wherein said outer surface of said neck and the outer surface of said head are maintained in essentially perfect concentricity and axial alignment during withdrawal of said head through said aperture to provide thereby essentially uniform circumferential thickness of the neck wall.

3. The process of claim 2 wherein the outer surfaces of the body and neck of said casing are maintained in essentially perfect concentricity and axial alignment during said application of pressure to the outer surface of said neck.

4. The process of claim 1 wherein said casing is brass and said neck is annealed prior to the diameter reduction and axial extrusion thereof.

5. The process of claim 4 wherein the annealing is substantially uniform around the circumference of said neck.

6. The process of claim 1 wherein said uniform pressure is generated by forcing said cartridge neck into the smaller diameter second cavity of said die.

7. Cartridge reloading apparatus comprising cartridge casing support means adapted to engage the base of a cartridge casing for holding said casing in a fixed attitude, die means having a first cavity formed to receive a substantial portion of the body of said casing and a second and contiguous cavity formed to receive the neck of said casing, frame means for supporting said support means and said die means with the axis of said die cavities and said support means being essentially in alignment, extrusion ram means having a shank and a head, the diameter of said head being greater than the diameter of the adjacent portion of said shank, first power means for axially moving said support means and said die means with respect to each other, and second power means for progressively moving said head axially into and out of said die cavities independently of any relative motion between said support means and said die means.

8. The apparatus of claim 7 wherein the overall surface contours of said first and second die cavities substantially conform to the cartridge casing body and neck contours.

9. The apparatus of claim 7 wherein said support means is mounted on said frame means for axial motion, and said die means is mounted on said frame means in fixed position.

10. The apparatus of claim 7 wherein said die means comprises a die body which contains said first and second cavities and which is provided with connector means for removably connecting said die means to said frame means.

11. The aparatus of claim 7 wherein said second power means comprises a hand lever pivotally connected at a first point intermediate its ends to said ram means, and pivotally connected at a second point adjacent one of its ends to one end of a link bar, the other end of said link bar being pivotally connected to a stationary portion of the apparatus, whereby force applied to said ram means by the lever will always be substantially axial.

12. The apparatus of claim 10 wherein said connector means comprises a threaded end of said die body mating with a threaded aperture in said frame means.

13. The apparatus of claim 11 wherein said die body is further provided with a cylindrical aperture for slidably receiving said ram means, the axis of said aperture being essentially in alignment with the axis of said die cavities and said support means.

14. The apparatus of claim 11 wherein said link bar is pivotally connected to a split collar which is adapted to clamp to said die body.

15. The apparatus of claim 7 wherein said shank of said ram is removably threaded into said ram for easy replacement with a head of different dimensions.

* * * * *

UNITED STATES PATENT AND TRADEMARK OFFICE
CERTIFICATE OF CORRECTION

PATENT NO. : 4,675,958

DATED : June 30, 1987

Page 1 of 2

INVENTOR(S) : Glen E. Rosebaum et al

It is certified that error appears in the above-identified patent and that said Letters Patent is hereby corrected as shown below:

Insert Figures 2-5 as part of Letters Patent as shown on the attached sheet.

Signed and Sealed this

Fifth Day of January, 1988

Attest:

DONALD J. QUIGG

Attesting Officer

Commissioner of Patents and Trademarks